(12) United States Patent
Jauss et al.

(10) Patent No.: US 11,828,209 B2
(45) Date of Patent: Nov. 28, 2023

(54) FLUID CELL AND DOCKING STATION

(71) Applicant: MAHLE International GmbH, Stuttgart (DE)

(72) Inventors: Stefan Jauss, Donzdorf (DE); Michael Neubauer, Waiblingen (DE); Julia Ruppert, Weil der Stadt (DE); Michael Walz, Filderstadt (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/588,236

(22) Filed: Jan. 29, 2022

(65) Prior Publication Data

US 2022/0243622 A1 Aug. 4, 2022

(30) Foreign Application Priority Data

Jan. 29, 2021 (DE) .................... 10 2021 200 829.1

(51) Int. Cl.
*F01M 11/03* (2006.01)
*B01D 29/01* (2006.01)
*B01D 35/153* (2006.01)
*B01D 35/30* (2006.01)
*F01M 11/00* (2006.01)

(52) U.S. Cl.
CPC ........... *F01M 11/03* (2013.01); *B01D 29/018* (2013.01); *B01D 35/153* (2013.01); *B01D 35/30* (2013.01); *F01M 11/0004* (2013.01); *F01M 2011/0029* (2013.01)

(58) Field of Classification Search
CPC ............... F01M 11/03; F01M 11/0004; F01M 2011/0029; F01M 11/0458; F01M 1/10; F01M 11/0408; F01M 11/04; B01D 29/018; B01D 35/153; B01D 35/30
See application file for complete search history.

(56) References Cited

U.S. PATENT DOCUMENTS

2007/0232475 A1* 10/2007 Baumann ............... B01D 35/30
494/36

FOREIGN PATENT DOCUMENTS

WO WO-2019170917 A1 * 9/2019
WO WO-2020254212 A1 * 12/2020

* cited by examiner

*Primary Examiner* — Syed O Hasan
(74) *Attorney, Agent, or Firm* — Ewers IP Law PLLC; Falk Ewers

(57) ABSTRACT

A fluid cell for an assembly and for filtering oil includes a fluid cell housing with a housing opening and partly surrounds a housing interior, a housing cover attached releasably to the fluid cell housing for closing the housing opening, and a filter device arranged in the housing interior for filtering the oil, in which a filter element is arranged and which fluidically communicates with a raw oil line for conducting the oil to be filtered into the filter device and with a clean oil line for conducting the filtered oil out of the filter device. An oil reservoir is arranged in the housing interior for storing oil, which fluidically communicates with an oil reservoir line for conducting oil out of the oil reservoir, and a fluid cell valve device for closing and opening the raw oil line, the clean oil line, and the oil reservoir line.

12 Claims, 6 Drawing Sheets

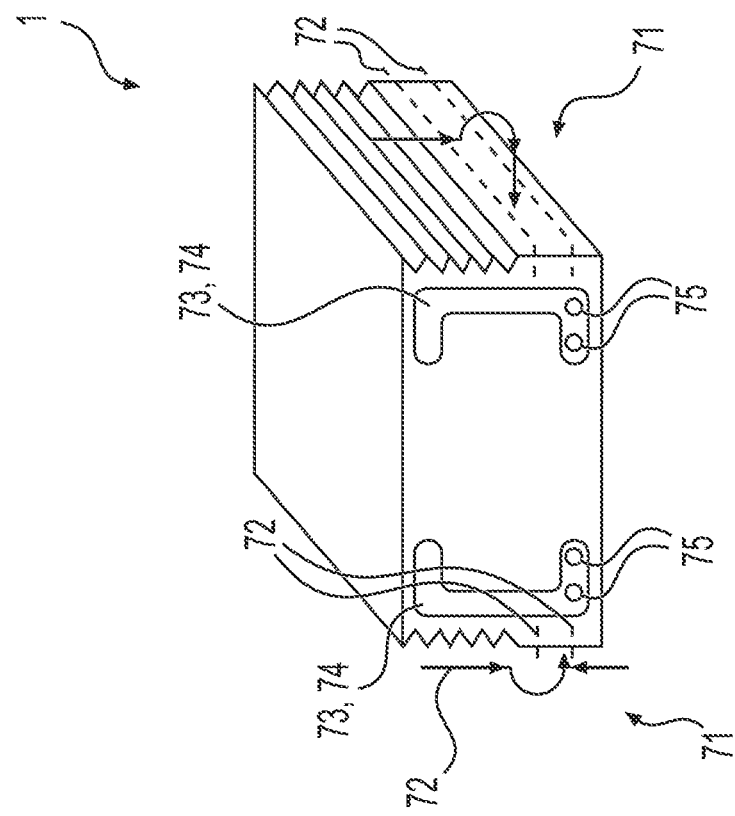
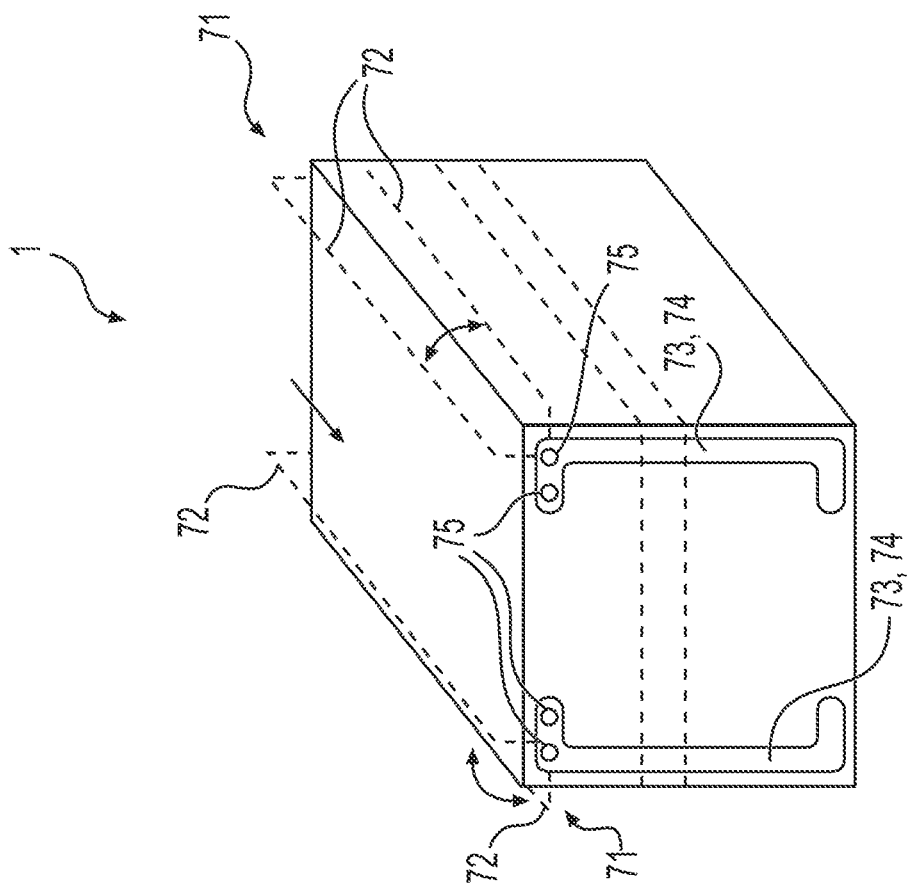

FLUID CELL AND DOCKING STATION

CROSS REFERENCE TO RELATED APPLICATIONS

This application claims priority to German patent application DE 10 2021 200 829.1, filed Jan. 29, 2021, the entire content of which is incorporated herein by reference.

TECHNICAL FIELD

The present disclosure relates to a fluid cell for an assembly and for filtering oil, and to an assembly having such a fluid cell and a docking station for receiving the fluid cell.

BACKGROUND

Filter systems for fluid cells, in particular oil filter systems for oil change cells of internal combustion engines have been known for some time. Typically, such a filter system is of modular design and includes a fluid cell, in which the filter device for filtering the fluid concerned—typically a filter element with a suitable filter medium—is arranged. Apart from this, conventional fluid cells contain an oil reservoir in which oil for the internal combustion engine can be stored. The fluid cell with the filter device and with the oil reservoir can be mounted to a counterpart arranged on an internal combustion engine, also known by the term "docking station" to the relevant person skilled in the art.

Here it often proves to be problematic that prior to mounting the fluid cell to the docking station no oil may leak out of the oil reservoir or the filter device of the fluid cell into the external environment of the fluid cell. The same applies after the demounting of the fluid cell from the docking station. Conversely, it is urgently necessary that with a fluid cell mounted to the docking station a fluid connection both of the filter device and also of the oil reservoir with the docking station and thus—via the same—with the internal combustion engine is ensured.

Apart from this, the installation space that is typically available for such a fluid cell in a motor vehicle only to a limited degree proves to be problematic. When searching for a solution to the problems concerning an oil leakage from the fluid cell into the environment that has to be avoided, as explained above, it therefore also has to be taken into account that such a solution should typically not have a negative effect on the additionally needed installation space.

SUMMARY

It is therefore an object of the present disclosure to show new ways in the development of an assembly of fluid cell and docking station. In particular, a fluid cell or an assembly with fluid cell and docking station is to be created, which takes into account the problems explained above.

The object is achieved by a fluid cell for an assembly with a docking station and for filtering oil, and by an assembly for an internal combustion engine of a motor vehicle, as described herein.

Accordingly, a general idea of the disclosure is to equip a fluid cell that can be mounted to a docking station with a valve device, with which the supply and discharge of oil into or out of a filter device of the fluid cell as well as out of an oil reservoir integrated in the filter cell can be controlled. According to an aspect of the disclosure, such a valve device serves for optionally opening or closing oil lines provided in the fluid cell, which fluidically communicate with the filter device or with the oil reservoir. With the valve device that is substantial for the disclosure it can be reliably excluded that in a state of the fluid cell not mounted to the docking station—i.e., the counterpart of the fluid cell—oil can leak out of the fluid cell into the external environment. To this end, said oil lines of the fluid cell are sealed in a fluid-tight manner with the help of the valve device. Conversely, in the case of the fluid cell mounted to the docking station, said oil lines can be opened with the valve device for oil to flow through so that by way of these oil can be transported from and to the filter device or out of the oil reservoir. According to another aspect of the disclosure, the oil reservoir formed in the fluid cell is volume-variable in design. This means that the volume of the oil reservoir can be adapted to the volume of the oil stored in the oil reservoir. Thus, the volume required by the fluid cell can be reduced as soon as the oil originally received in the oil reservoir—after the mounting of the fluid cell to the docking station—has been partly or completely discharged out of the fluid cell and transported via the docking station to the internal combustion engine.

A fluid cell according to an aspect of the disclosure for an assembly and for filtering oil includes a fluid cell housing, which comprises a housing opening and partly surrounds a housing interior. Furthermore, the fluid cell includes a housing cover that can be attached or is attached, in particular releasably, to the fluid cell housing for closing the housing opening. Furthermore, the fluid cell includes a filter device arranged in the housing interior for filtering the oil. Here, in particular dirt particles can be separated from the oil. For this purpose, a filter element—typically replaceable—is arranged in the filter device. The filter device—and thus its filter element—fluidically communicates with a raw oil line for conducting the oil to be filtered into the filter device and furthermore also with a clean oil line for conducting the filtered oil out of the filter device. Furthermore, the fluid cell includes an oil reservoir of variable volume arranged in the housing interior for storing oil. The oil reservoir fluidically communicates with an oil reservoir line for discharging the oil stored in the oil reservoir. According to an aspect of the disclosure, the fluid cell finally includes a fluid cell valve device for closing and opening raw oil line, clean oil line and oil reservoir line.

According to an exemplary embodiment, the fluid cell valve device includes for each of the three lines, i.e., for the raw oil line, the clean oil line and the oil reservoir line, an adjustable fluid cell valve body. The same is adjustable between a closed position, in which the respective line is sealed in a fluid-tight manner, and an open position, in which the respective line is opened for oil to flow through. The fluid cell valve bodies are preloaded towards the closed position with a respective fluid cell preloading element. This ensures that with a fluid cell not mounted to a docking station no oil can leak out of the fluid cell. The opening of the valve device of the fluid cell can take place with an adjusting device provided on the docking station.

Typically, the fluid cell valve device is designed so that it is adjustable with an external adjusting device. Such an adjusting device can be provided on the said docking station so that with a fluid cell mounted to the docking station the fluid cell valve bodies of the fluid cell valve device are adjusted—in particular against a preload force generated by the preloading elements—from the closed position into the open position.

According to an advantageous further development, the respective fluid cell valve opening is adjustably arranged in the raw oil line and clean oil line and oil reservoir line.

Particularly typically, a tubular body each typically formed in the manner of a sleeve is adjustably arranged relative to the raw oil line or clean oil line or oil reservoir line in the raw oil line, in the clean oil line and in the oil reservoir line. In this embodiment, a front-face opening of the tubular body forms the respective—adjustable—valve opening.

For the volume-variable design, the oil reservoir practically comprises a covering of a flexible, typically elastic material. This makes possible realising an oil reservoir with variable volume in a technically simple manner.

Particularly practically, the covering can be formed by a film—in particular of the said flexible and elastic material—this version is accompanied by particularly low production costs.

According to an advantageous further development, the housing cover can be formed so as to be adjustable relative to the fluid cell housing, namely between a maximum position, in which the housing interior has a maximum volume, and a minimum position, in which the housing interior has a minimum volume. Thus, the volume of the housing interior jointly delimited by the fluid cell housing and the housing cover can be easily reduced when at least a part of the original quantity of stored oil has been conducted out of the oil reservoir after the fluid cell has been connected via a docking station with an internal combustion engine.

Particularly typically, the housing opening is arranged in an opening plane. In this version, the housing cover is adjustably arranged on the fluid cell housing transversely, typically perpendicularly, to the opening plane, in particular along an axial direction. This version is particularly easily realisable technically speaking. In particular, the housing cover can be easily adjusted relative to the fluid cell housing by a worker or with a suitable drive.

According to an advantageous further development, the oil reservoir and the housing interior are dimensioned and matched to one another so that by adjusting the housing cover from the maximum position to the minimum position, in particular into the minimum position, oil stored in the oil reservoir is at least partially discharged, in particular forced out of the oil reservoir via the oil reservoir line. This can take place manually by a worker. Alternatively or additionally, it is conceivable for this purpose that the oil is conveyed out of the oil reservoir with a suitable conveying device. In particular, the oil can be pumped out of the same with a suitable oil pump.

According to another advantageous further development, a joint attachment mechanism is formed on the fluid cell housing and on the housing cover, with which the housing cover can be fixed in the minimum position on the fluid cell housing. In this way, the housing cover can be fixed in a mechanically stable manner in the minimum position, in particular after a part of the oil originally accommodated in the oil reservoir has been discharged out of the same.

A further exemplary embodiment, in which the oil reservoir and the housing interior are dimensioned and matched to one another so that the oil reservoir, in a state maximally filled with oil, is partly arranged in a differential volume of the housing interior by which the volume of the housing interior, during the adjusting of the housing cover from the minimum position into the maximum position, changes, proves to be particularly installation space-saving.

Furthermore, the disclosure relates to an assembly for an internal combustion engine of a motor vehicle. The assembly includes a fluid cell according to an aspect of the disclosure introduced above. The advantages of the fluid cell according to an aspect of the disclosure explained above thus apply also to the assembly according to the disclosure. In addition to the fluid cell, the assembly according to an aspect of the disclosure includes a docking station that can be fluidically connected to an internal combustion engine. The docking station comprises a mount, onto which the fluid cell can be placed and releasably fixed with an adjusting device of the docking station. Apart from this, the docking station includes a first, a second and a third fluid line, each for oil to flow through. According to an aspect of the disclosure, the docking station is designed in such a manner that with the fluid cell fixed in/to the docking station, the first fluid line fluidically communicates with the raw oil line of the fluid cell, the second fluid line with the clean oil line of the fluid cell and the third fluid line with the oil reservoir line of the fluid cell.

The adjusting device that is substantial for the disclosure allows the worker to fix the fluid cell on the docking station in a simple manner. Here it is ensured that with the fluid cell fixed to or in the docking station a fluid connection with the docking station can be automatically established, which allows oil to be transported between the fluid cell and the docking station. Thus, following the fixing of the fluid cell to the docking station, oil can be immediately transported from the fluid cell to an internal combustion engine connected to the docking station, and in the opposite direction.

Particularly typically, the adjusting device and a docking valve device of the docking station are designed and matched to one another in such a manner that the docking valve device with the fluid cell fixed to the docking station, opens the three fluid lines of the docking station and the raw oil line, the clean oil line and the oil reservoir line of the fluid cell for oil to flow through.

Typically, the docking station and the fluid cell can be designed and matched to one another so that when the fluid cell is removed from the docking station, the raw oil line, the clean oil line, the oil reservoir line and the three fluid lines, through interaction of the adjusting device with the fluid cell valve device and with the docking valve device, are sealed in a fluid-tight manner. With respect to the undesirable leakage of oil out of the fluid cell or out of the docking station, this version offers maximum operational safety.

Particularly typically, the docking valve device and the fluid cell valve device can be arranged and matched to one another in such a manner that with the fluid lines opened by the docking valve device for oil to flow through, the raw oil line, the clean oil line and the oil reservoir line are also opened by the fluid cell valve device for oil to flow through. In this way, a manual adjusting of the fluid cell valve body of the fluid cell valve device is no longer required.

According to an advantageous further development, the docking valve device comprises for each of the three fluid lines a docking valve body arranged in the fluid line concerned that is adjustable between an open position and a closed position. In this version, each of the docking valve bodies seals in a fluid-tight manner a docking valve opening each provided in the fluid line concerned in the closed position and opens this docking valve opening in the open position for oil to flow through.

In order to prevent that following the demounting of the fluid cell from the docking station residual oil remaining in the same can leak into the external environment of the docking station, it is proposed according to a further exemplary development, to provide the docking station with docking preloading elements, so that the docking valve body is preloaded towards the closed position with a respective docking preloading element.

Particularly typically, the three fluid lines on the end side each comprise a respective fluid line connection, into/onto which the raw oil line or the clean oil line or the oil reservoir line can be inserted or plugged on. Thus, during the course of the mounting of the fluid cell, the required fluid connection between the fluid cell of the docking station can be established on the docking station in a simple manner.

Particularly practically, the docking valve device and the fluid cell valve device are designed and matched to one another in such a manner that the fluid cell valve body, following the inserting/plugging-on of the raw oil line, of the clean oil line and of the oil reservoir line into/onto the respective fluid line touch the respectively assigned docking valve body, i.e., are mechanically in contact with the same. In this state, both the fluid cell valve bodies and also the docking valve bodies can be jointly actuated with the adjusting device.

Particularly typically, the fluid line connections form an axial stop for the sleeve-like tubular bodies of the fluid cell. This stop delimits the movement of the tubular bodies and thus of the fluid cell valve openings. Upon a further movement of the fluid cell valve bodies—and thus also of the docking valve bodies touching the fluid cell valve bodies—with the help of the adjusting device the tubular bodies and thus the fluid cell valve openings cannot further follow this movement. The consequently developing relative movement between the fluid cell valve bodies and the fluid cell valve openings corresponds to an adjustment of the fluid cell valve bodies from the closed into the open position. The same applies to the docking valve bodies since these—jointly with the fluid cell valve bodies—are likewise adjusted relative to the fluid lines of the docking station and thus relative to the docking valve openings. Thus, the docking valve bodies are also adjusted from their closed position into the open position.

As explained above, at least one docking valve body, typically all docking valve bodies, of the docking valve device is/are designed for adjusting the assigned fluid cell valve bodies of the fluid cell valve device.

Particularly typically, at least one docking valve body, typically all docking valve bodies, and the assigned fluid cell valve body or valve bodies is/are matched to one another so that an adjustment of the docking valve body between its open position and its closed position is accompanied by an adjustment of the fluid cell valve body between its open position and its closed position.

Particularly typically, the adjusting device of the docking station includes a lever arrangement for actuating the docking valve device, with which in particular at least one docking valve body, typically all docking valve bodies, can be adjusted between their respective open position and closed position.

Particularly typically, the lever arrangement comprises an adjusting element interacting with the docking valve device, in particular with at least one docking valve body and additionally a handle for the lever arrangement to be actuated by a worker. Such an operative connection of the handle with the adjusting element makes possible a simple adjusting of the docking valve bodies, in particular in the open position of these, by the worker.

According to an advantageous further development, the adjusting element is designed so that, in a state of the fluid cell placed onto the mount, it engages into at least one, typically two recess/recesses formed on the fluid cell, in particular on the fluid cell housing. This makes possible the required adjustment of the fluid cell housing including the fluid cell valve device relative to the mount of the docking station, in order to establish in this way the desired fluid connections between fluid cell and docking station for oil to flow through.

Thus, the fluid cell and the docking station are typically designed and matched to one another in such a manner that with the adjusting element received in the recess, the fluid cell, in particular the fluid cell housing and the fluid cell valve device, is driven, upon a movement of the adjusting element caused with the lever arrangement, so that the fluid cell, in particular the fluid cell housing and the fluid cell valve device, moves relative to the mount, in particular of the mounting plate, of the docking station.

Particularly practically, the docking station is designed so that the fluid cell can be placed onto the docking station along a first extension direction and subsequently fixed on the docking station with the adjusting device through a movement along a second extension direction perpendicularly to the first extension direction.

Particularly typically, the lever arrangement comprises at least one lever element, typically two lever elements which is/are (each) adjustably mounted on the docking station with a three-joint arrangement. With such a lever arrangement, the force to be generated by the worker for the actuation can be kept reduced so that the adjusting device can be comfortably actuated.

According to an advantageous further development, the three joint arrangement comprises a first, second and third joint. In this further development, the first joint connects the docking station with a support lever in an articulated manner, which connects the second joint with the lever element in an articulated manner. The third joint in this further development connects the lever element, typically directly, with the adjusting element in an articulated manner.

Particularly typically, the third joint can be linearly adjustably mounted on the docking station with a slotted guide. In this way, an adjusting mechanism can be realised in a particularly simple manner with which the actuation of the handle by the worker runs along the first extension direction to a movement of the fluid cell relative to the docking station along the second extension direction perpendicularly to the first extension direction.

Practically, the adjusting element is connected to the lever arrangement, in particular to the third joint or is part of the third joint.

Further important features and advantages of the disclosure are obtained from the drawings and from the associated figure description by way of the drawings.

It is to be understood that the features mentioned above and still to be explained in the following cannot only be used in the respective combinations stated, but also in other combinations or by themselves without leaving the scope of the present disclosure.

BRIEF DESCRIPTION OF THE DRAWINGS

The disclosure will now be described with reference to the drawings wherein:

FIGS. 7A and 7B show the function of an attachment mechanism of a fluid cell, with which the fluid cell can be releasably attached to a docking station.

DESCRIPTION OF EXEMPLARY EMBODIMENTS

Figure 1:
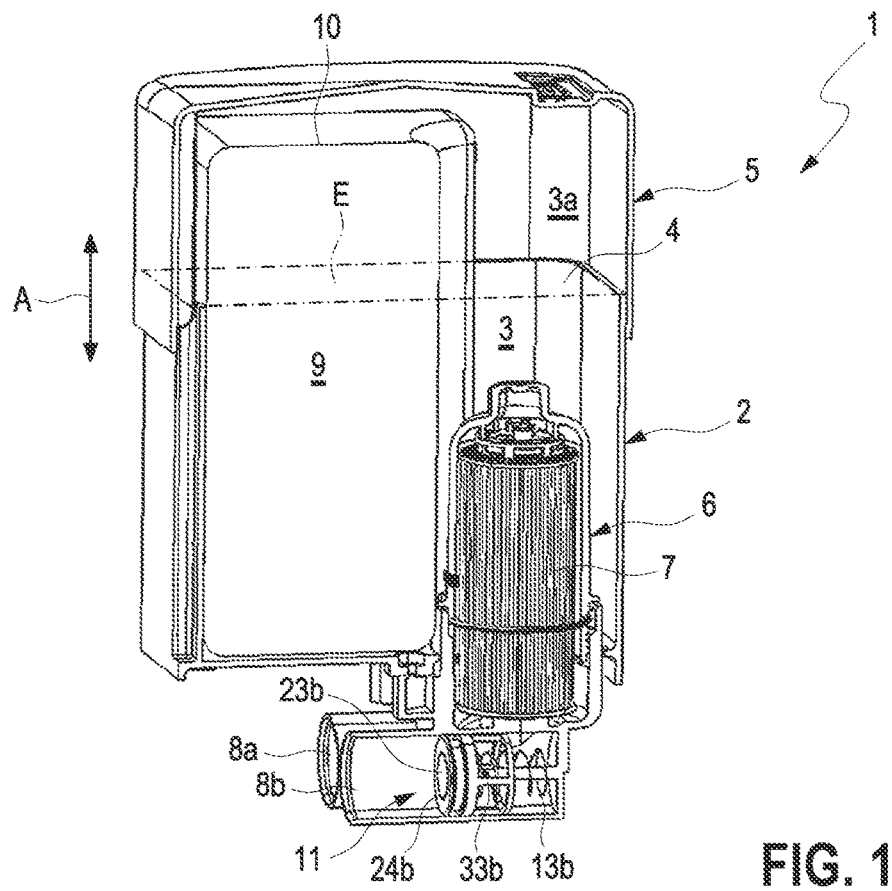
FIG. 1 shows a fluid cell for an assembly in a part representation according to an exemplary embodiment of the disclosure.

FIG. 1 illustrates in a part view an example of a fluid cell 1 according to the disclosure for an assembly for filtering oil in a perspective representation. Accordingly, the fluid cell 1 includes a fluid cell housing 2, in which a housing opening 4 is arranged and which partially surrounds a housing interior 3. Furthermore, the fluid cell 1 includes a housing cover 5 that can be releasably attached or is attached to the fluid cell housing 2 for closing the housing opening 4. In the housing interior 3, a filter device 6 for filtering the (raw) oil is arranged. The filter device 6 can be designed as a conventional ring filter device. In the filter device 6 a filter element 7 is present. For conducting (raw) oil into the filter device 6 or into the filter element 7, the fluid cell 1 includes a raw oil line 8a, which fluidically communicates with an inflow side of the filter element 7. For conducting the filtered (clean) oil out, the fluid cell 1 includes a clean oil line 8b which fluidically communicates with an outflow side of the filter element 7.

As is additionally illustrated by FIG. 1, the filter cell 1 includes an oil reservoir 9 of variable volume arranged in the housing interior 3 for storing oil for the internal combustion engine. The fluid cell 1 also includes an oil reservoir line 8c, which for conducting stored oil out of the oil reservoir 9 fluidically communicates with the same. For the volume-variable design, the oil reservoir 9 can comprise a covering 10 of a flexible and elastic material. For example, the covering 10 can be formed by a film.

Finally, the fluid cell 1 includes a fluid cell valve device 11 for closing and opening the raw oil line 8a, the clean oil line 8b and the oil reservoir line 8c.

Figure 2:
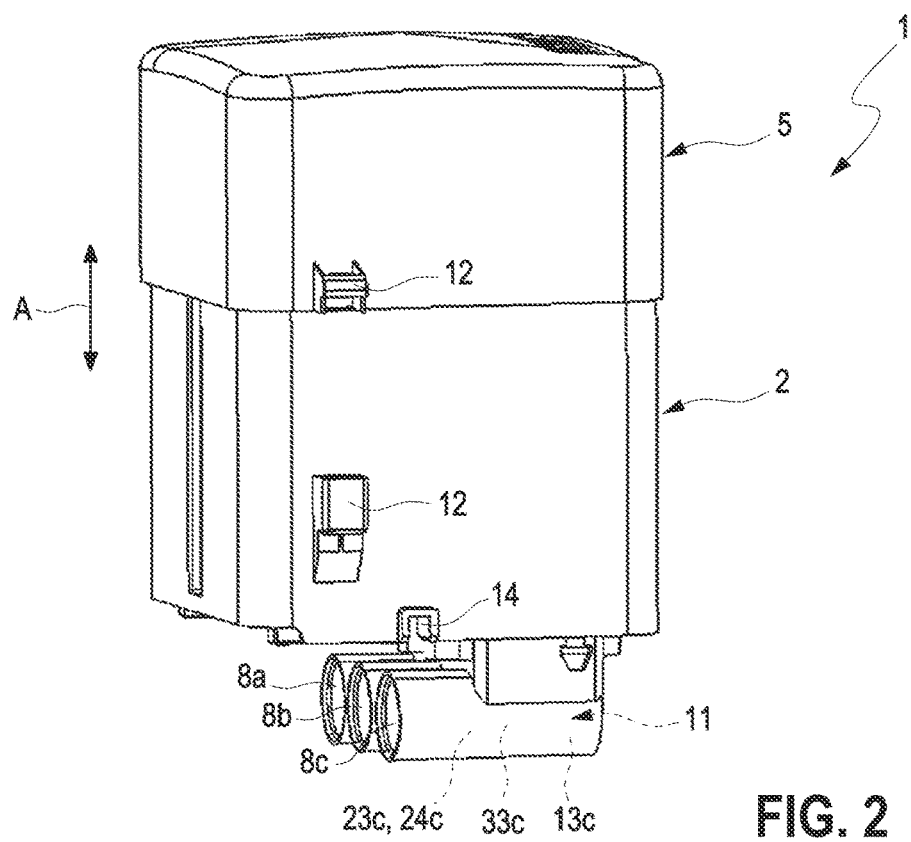
FIG. 2 shows the fluid cell of FIG. 1 in a perspective representation.

According to FIG. 1, the housing opening 4 extends in an opening plane E. The housing cover 5 is adjustably arranged on the fluid cell housing 2 along an axial direction A perpendicularly to the opening plane E. Here, the housing cover 5 cannot only be releasably attached to the fluid cell housing 2 but, in the state attached to the fluid cell housing 2, be formed adjustably, namely between a maximum position shown in FIGS. 1 and 2, in which the housing interior 3, delimited by the fluid cell housing 2 and housing cover 5, has a maximum volume, and a minimum position (not shown in FIG. 1), in which the housing interior 3 has a minimum volume. The oil reservoir 9 and the housing interior 3 are dimensioned and matched to one another so that the oil reservoir 9, in a state maximally filled with oil, is partly arranged in a differential volume 3a of the housing interior 3, by which the total volume of the housing interior 3 changes upon adjusting of the housing cover 5 from the minimum position into the maximum position—and vice versa.

On the fluid cell housing 2 and on the housing cover 5 an attachment mechanism 12 is formed, with which the housing cover 5 can be fixed in the minimum position on the fluid cell housing 2. The oil reservoir 9 and the housing interior 3 are dimensioned and matched to one another so that by adjusting the housing cover 5 from the maximum position towards the minimum position, in particular into the minimum position, oil stored in the oil reservoir 9 is at least partly conducted—in particular forced—out of the oil reservoir 9 via the oil reservoir line 8c.

Figure 3:
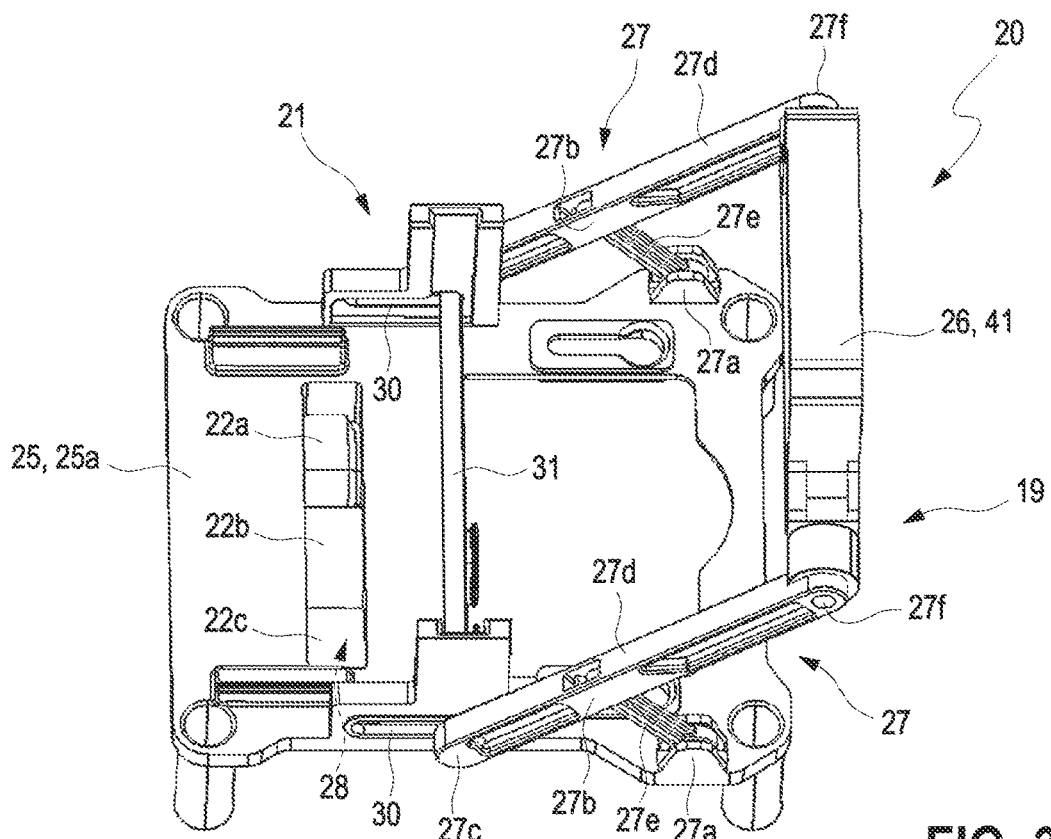
FIG. 3 shows a docking station for receiving the fluid cell in a perspective representation.

FIG. 3 shows in a perspective representation a docking station 20 that can be fluidically connected to the internal combustion engine, to which the fluid cell 1 can be releasably fixed with an adjusting device 21 of the docking station 20. The fluid cell 1 and the docking station 20 together form an assembly 40.

The docking station 20 comprises a mount 25 onto which the fluid cell 1 can be placed. The mount 25 can be designed as a mounting plate 25a. The docking station 20 furthermore comprises a first, second and third fluid line 22a, 22b, and 22c. Furthermore, the docking station 20 comprises an adjusting device 21, with which the fluid cell 1 can be moved relative to the mount 25 and in this manner releasably fixed to the docking station 20. Here, the docking station 20 and the fluid cell 1 are designed and matched to one another in such a manner that with the fluid cell 1 fixed on the docking station 20 the first fluid line 22a fluidically communicates with the raw oil line 8a, the second fluid line 22 fluidically communicates with the clean oil line 8b, and the third fluid line 22c fluidically communicates with the oil reservoir line 8c.

Figure 4:
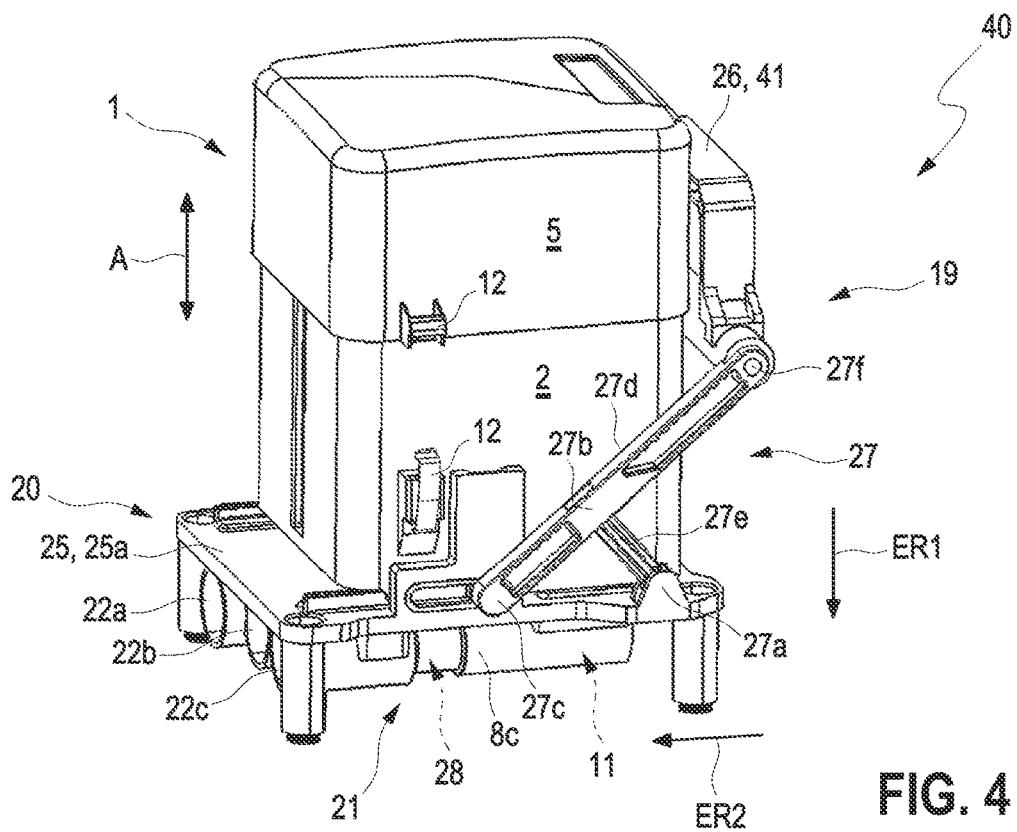
FIG. 4 shows an assembly of fluid cell and docking station in a perspective representation.

FIG. 4 shows the fluid cell 1 in a state fixed on the docking station 20. The docking station 20 is designed so that the fluid cell 1 can be initially placed onto the mount 25 or mounting plate 25a of the docking station 20 along a first extension direction ER1 and subsequently, be fixed to the docking station 20 with an adjusting device 21 provided on the docking station 20 through a movement along a second extension direction ER2 perpendicularly to the first extension direction ER1.

According to FIGS. 1 to 4, the fluid cell valve device 11 thus includes for each of the three lines 8a, 8b, and 8c, i.e., for the raw oil line 8a, the clean oil line 8b, and the oil reservoir line 8c, an adjustable fluid cell valve body 23a, 23b, and 23c. The respective fluid cell valve body 23a, 23b, and 23c is adjustable between a closed position, in which a valve opening 24a, 24b, and 24c of the fluid cell valve device 11 provided in the respective line 8a, 8b, and 8c is sealed in a fluid-tight manner, and an open position, in which the respective valve opening 24a, 24b, and 24c or line 8a, 8b, and 8c is open for oil to flow through.

According to FIGS. 4 and 5A to 5C, the docking station 20 includes a docking valve device 28 for closing and opening the three fluid lines 22a, 22b, and 22c of the docking station 20. The docking valve device 28 comprises for each of the three fluid lines 22a, 22b, and 22c a docking valve body 29a, 29b, and 29c that is arranged in the fluid line 22a, 22b, and 22c concerned and adjustable between an open position and a closed position. Each of the docking valve bodies 29a, 29b, and 29c seals, in the closed position, a docking valve opening 32a, 32b, and 32c that is present in the fluid line 22a, 22b, and 22c concerned in a fluid-tight manner and opens the same in the open position for oil to flow through.

Figure 5A:
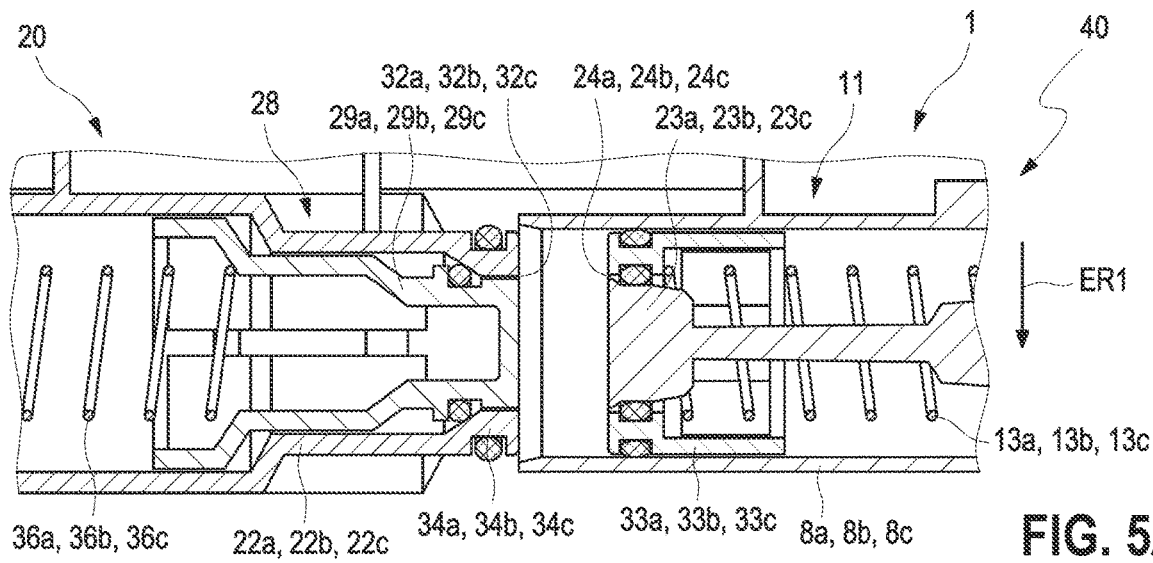
FIGS. 5A to 5C show representations illustrating the mounting of the fluid cell on the docking station.
Figure 5B:
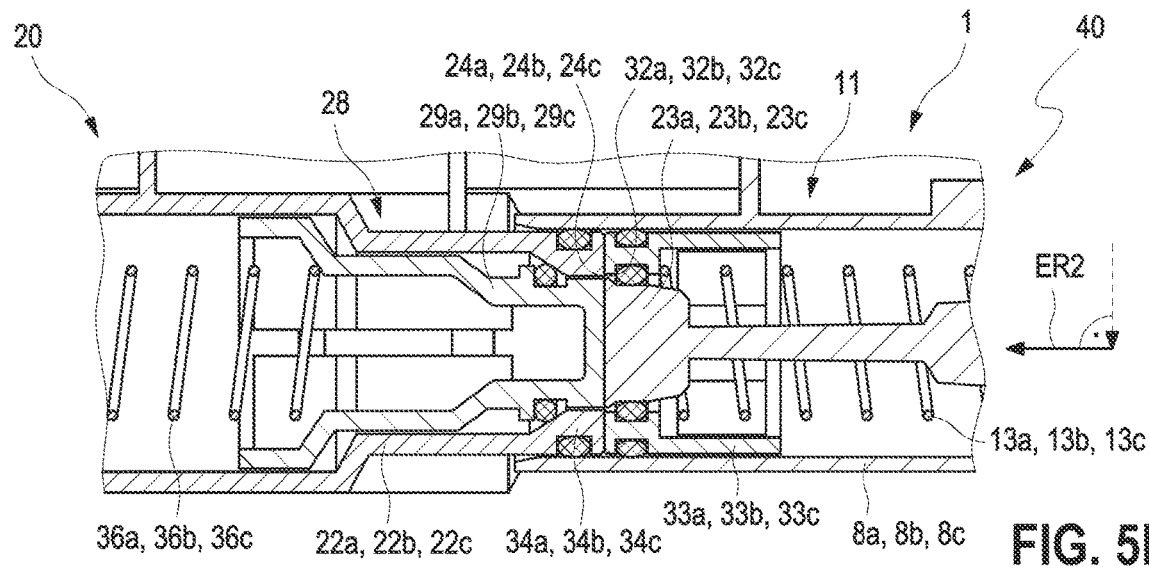
Figure 5C:
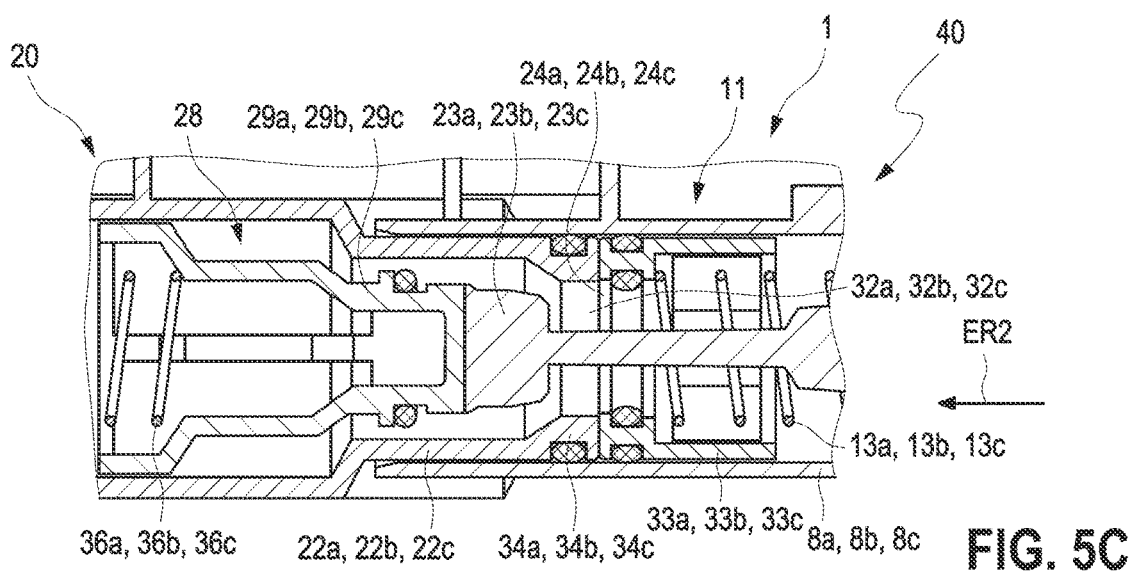

As is evident from the FIGS. 5A to 5C, the respective fluid cell valve opening 24a, 24b, and 24c is adjustably arranged in the raw oil line 8a and clean oil line 8b and oil reservoir line 8c respectively. For this purpose, a tubular body 33a, 33b, and 33c formed sleeve-like is adjustably arranged in the raw oil line 8a and clean oil line 8b and oil reservoir line 8c along the second extension direction ER2. A front-face opening of the tubular body 33a, 33b, and 33c forms the respective—adjustable—valve opening 24a, 24b, and 24c.

The construction and the functioning of the fluid cell valve device 2 and of the docking valve device 23 including the operation of the adjusting device 21 are explained in the following by way of the FIGS. 5A to 5C. The adjusting device 21 and the docking valve device 28 are designed and matched to one another in such a manner that the docking valve device 28, with the fluid cell 1 fixed on or in the docking station 20, opens the three fluid lines 22a, 22b, and 22c of the docking station 20 and also the raw oil line 8a, the clean oil line 8b and the oil reservoir line 8c of the fluid cell 1 for oil to flow through. The docking station 20 with the docking valve device 28 and the fluid cell 1 are additionally designed and matched to one another so that when the fluid cell 1 is removed from the docking station 20, the raw oil line 8a, the clean oil line 8b, the oil reservoir line 8c as well as the three fluid lines 22a, 22b, and 22c are sealed in a fluid-tight manner or sealed so as to be fluid-tight following the removal.

FIG. 5A shows the fluid cell 1 and the docking station 20 after the placing of the fluid cell 1 onto the mount 25 or mounting plate 25a of the docking station 20 by movement along the first extension direction ER1. In this state, the raw oil line 8a is fluidically connected to the first fluid line 22a, the clean oil line 8b is fluidically connected to the second fluid line 22b and the oil reservoir line 8c is fluidically connected to the third fluid line 22c. The fluid cell valve bodies 23a, 23b, and 23c close the respective fluid cell valve opening 24a, 24b, and 24c. Accordingly, the docking valve bodies 29a, 29b, and 29c close the respective docking valve openings 32a, 32b, and 32c. Both the fluid cell valve bodies 23a, 23b, and 23c as well as the docking valve bodies 29a, 29b, and 29c are thus situated in a respective closed position. The docking valve bodies 29a, 29b, and 29c are arranged spaced apart from the associated fluid cell valve body 23a, 23b, and 23c.

As is illustrated in FIG. 5A, the fluid cell valve device 11 includes three fluid cell preloading elements 13a, 13b, and 13c, of which one each is arranged in the raw oil line 8a, in the clean oil line 8b and in the oil reservoir line 8c and preloads the respective fluid cell valve body 23a, 23b, and 23c into its respective closed position.

Analogously, the docking valve device 26 includes three preloading elements 36a, 36b, and 36c, of which one each is arranged in the first fluid line 22a, one in the second fluid line 22b and one in the third fluid line 22c and preloads the respective docking valve body 29a, 29b, and 29c into its respective closed position. For fixing the fluid cell 1 on the docking station 20, the fluid cell 1, starting out from the state shown in FIG. 5a, is now moved along the second extension direction ER2 running perpendicularly to the first extension direction ER1 relative to the docking station 20.

As is evident from the FIGS. 5A and 5B, the three fluid lines 22a, 22b, and 22c comprise at the end side a respective fluid line connection 34a, 34b, and 34c. The raw oil line 8a, the clean oil line 8b and the oil reservoir line 8c are plugged onto or pushed onto the respective fluid line connection 34a, 34b, and 34c by moving the fluid cell 1 along the second extension direction ER2. FIG. 5B shows this plugged-on state.

As is evident from FIG. 5B, the fluid cell valve bodies 23a, 23b, and 23c, following the plugging-on of the raw oil line 8a, of the clean oil line 8b and of the oil reservoir line 8c onto the respective fluid line 22a, 22b, and 22c onto the respective fluid line connection 34a, 34b, and 34c touch the respectively assigned docking valve body 29a, 29b, and 29c.

The docking valve device 28 and the fluid cell valve device 11 are designed and matched to one another in such a manner that with fluid lines 22a, 22b, and 22c opened with the docking valve device 28 for oil to flow through, the raw oil line 8a, the clean oil line 8b and the oil reservoir line 8c are also opened by the fluid cell valve device 11 for oil to flow through. For realising such an operative connection between docking valve device 28 and fluid cell valve device 11, the three docking valve bodies 29a, 29b, and 29c of the docking valve device 28 are designed for adjusting the respectively assigned fluid cell valve bodies 23a, 23b, and 23c of the fluid cell valve device 11. Since, according to FIG. 5B, the fluid cell valve bodies 23a, 23b, and 23c touch the respectively assigned docking valve body 29a, 29b, and 29c, after the raw oil line 8a, the clean oil line 8b and the oil reservoir line 8c have been plugged onto the respective fluid line 22a, 22b, and 22c, a further movement of the fluid cell valve bodies 23a, 23b, and 23c in the direction of the docking valve body 29a, 29b, and 29c causes these to be co-adjusted as desired.

Since according to FIG. 5B the three fluid line connections 34a, 34b, and 34c each form an (axial) stop 35a, 35b, and 35c for the assigned sleeve-like tubular body 33a, 33b, and 33c, a further movement of the fluid cell valve bodies 23a, 23b, and 23c causes a relative movement of the fluid cell valve bodies 23a, 23b, and 23c relative to the tubular bodies 33a, 33b, and 33c and thus relative to the fluid cell valve openings 24a, 24b, and 24c. This corresponds to an adjustment of the fluid cell valve bodies 23a, 23b, and 23c into their open position. The further movement of the fluid cell valve bodies 23a, 23b, and 23c in the extension direction ER2 causes—because of their mechanical contact with the docking valve bodies 29a, 29b, and 29c—that the docking valve bodies 29a, 29b, and 29c are adjusted into the open position relative to the three fluid lines 22a, 22b, and 22c and thus relative to the docking valve openings 32a, 32b, and 32c. This scenario is reflected in FIG. 5C.

This means that the three docking valve bodies 29a, 29b, and 29c and the respectively assigned fluid cell valve body 23a, 23b, and 23c are matched to one another so that an adjustment of a docking valve body 29a, 29b, and 29c from its closed position into its open position is accompanied by an adjustment of the assigned fluid cell valve body 23a, 23b, and 23c from its closed position into its open position.

In the state shown in FIG. 5C, oil can be conducted out of the oil reservoir 9 via the oil reservoir line 8c and the third fluid line 8c of the docking station 20. Following this or at the same time, the volume of the housing interior 2 can be reduced by moving the housing cover 5 along the axial direction A, i.e., along the first extension direction ER1 as has already been explained above by way of FIG. 2. In the state shown in FIGS. 6C and 6D, (raw) oil can also be conducted via the first fluid line 22a of the docking station 20 and the raw oil line 8a of the fluid cell 1 into the filter device 6, filtered there and subsequently conducted out of the filter device 6 via the clean oil line 8b and the second fluid line 22b of the docking station 20 again as (clean) oil.

An opposite movement of the fluid cell valve bodies 23a, 23b, and 23c from their open position back into their closed position is accordingly accompanied by an adjustment of the docking valve bodies 29a, 29b, and 29c into their closed position (not shown in the figures). Here, the docking preloading elements 36a, 36b, and 36c ensure that the docking valve bodies 29a, 29b, and 29c follow the movement of the fluid cell valve bodies 23a, 23b, and 23c back into the closed position. In this position, the fluid cell 1, by movement opposite to the extension direction ER1, can be again removed from the mount 25 of the docking station 20.

The mounting and fixing operation of the fluid cell 1 to the docking station 20 and—connected with this—the construction of the adjusting device 21 as well as the functioning of the same is explained in more detail in the following by way of the FIGS. 6A to 6D. Here, the FIGS. 6A to 6D can be interpreted as snapshot at different times of the attachment operation.

Figure 6A:
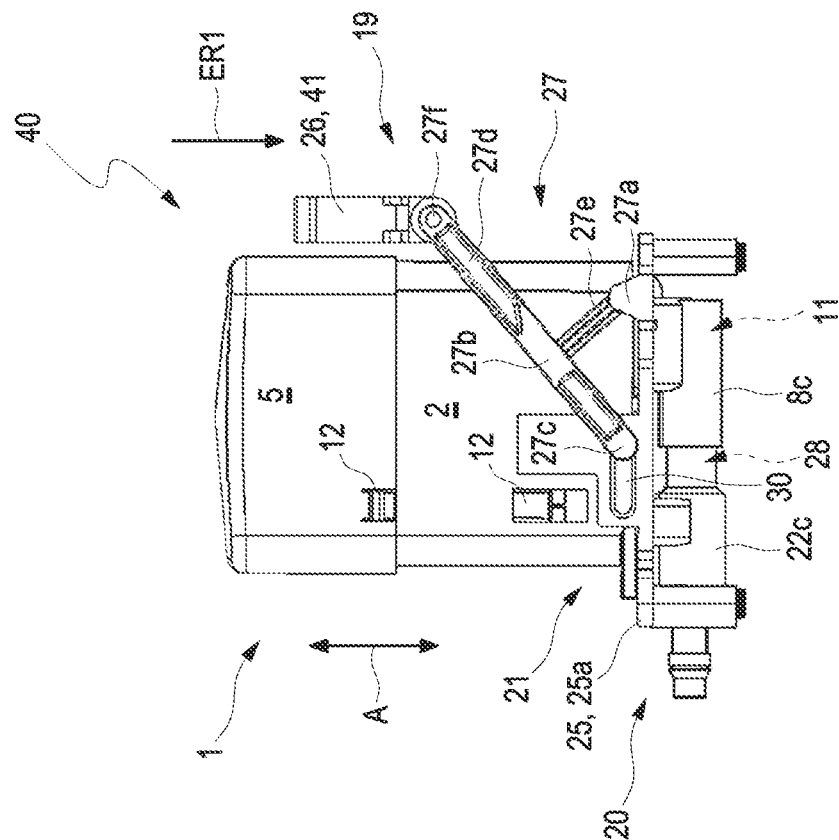
FIGS. 6A to 6D show representations illustrating the interaction of the valve device provided on fluid cell and docking station.

According to FIG. 6A, the docking station 20 is designed so that the fluid cell 1 can be placed, along a first extension direction ER1, onto the mount 25 of the docking station 20. Such a movement of the fluid cell 1 relative to the docking station 20 along the first extension direction ER1 is shown in FIG. 6A. Practically, the fluid cell 1 for this movement is oriented along the first extension direction ER1 beforehand so that the axial direction A of the fluid cell 1 extends parallel to the first extension direction ER1.

Figure 6B:
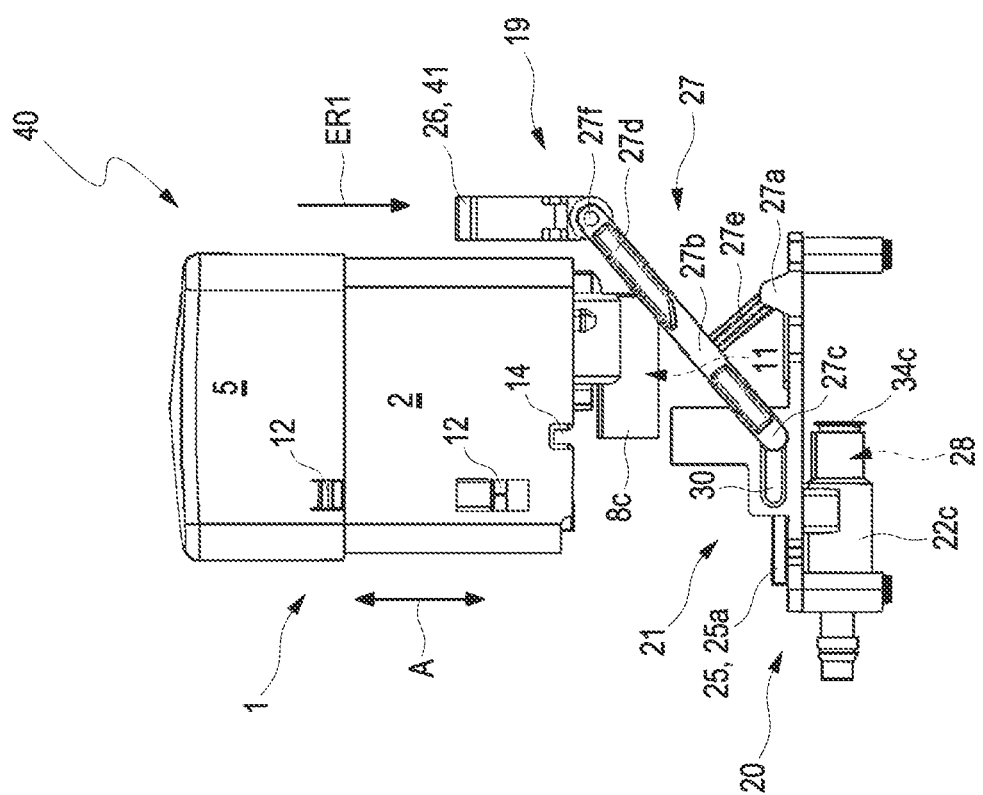
Figure 6C:
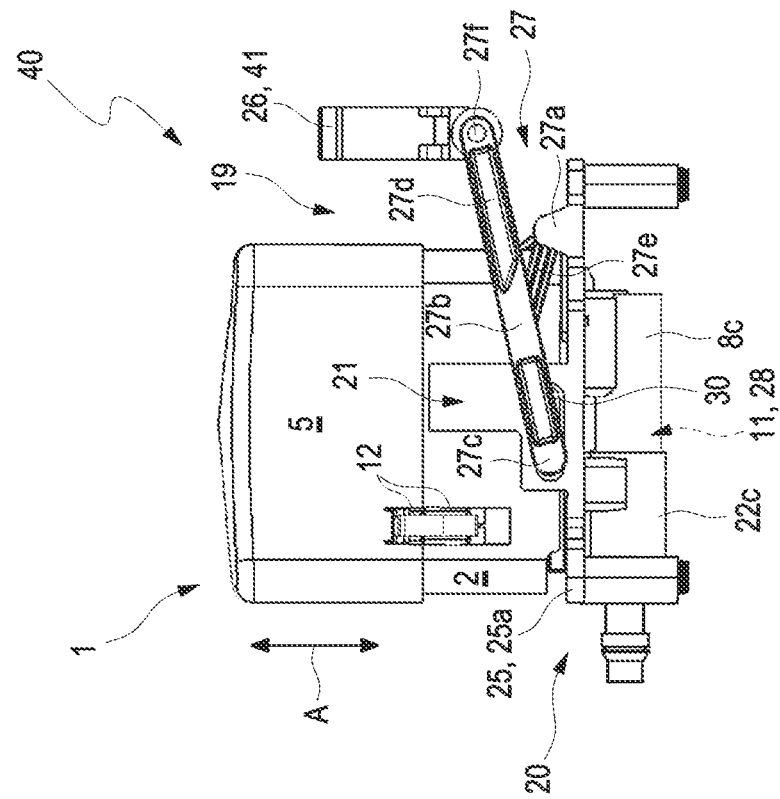
Figure 6D:
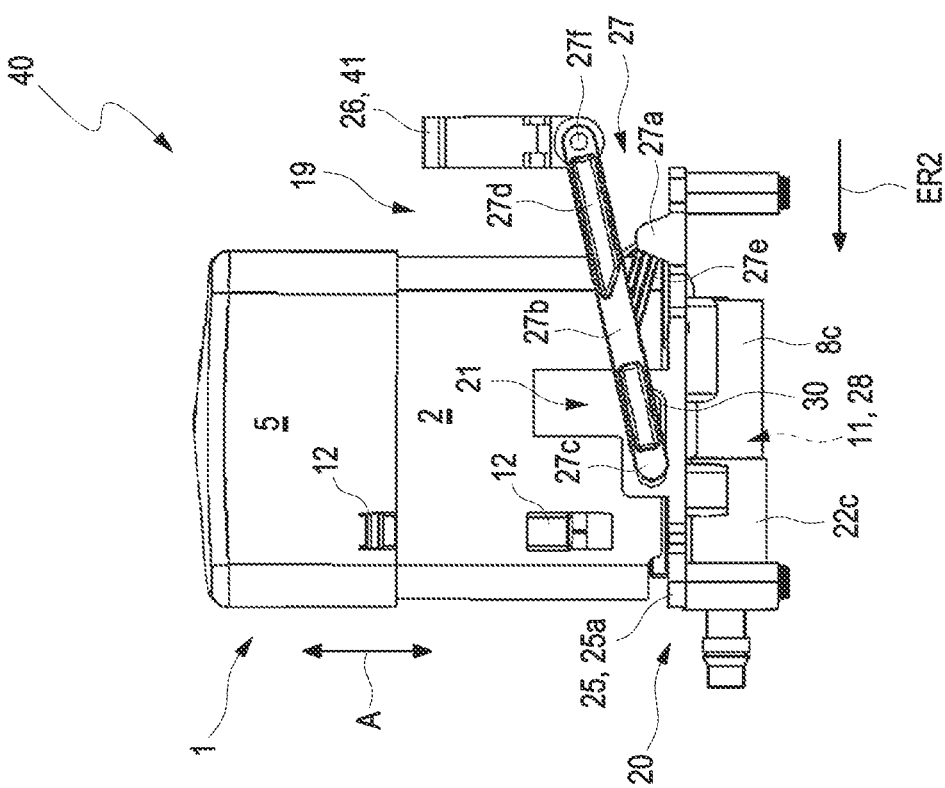

After the fluid cell 1 has been placed onto the mount 25 of the docking station 20—this scenario is illustrated in FIG. 6B—the raw oil line 8a, the clean oil line 8b and the oil reservoir line 8c of the fluid cell 1 are fluidically connected to the three fluid lines 22a, 22b, and 22c of the docking station 20. This state corresponds to the already explained arrangement shown in FIG. 5A of the fluid cell valve device 11 and of the docking valve device 28 relative to one another Now, the fluid cell 1, according to FIGS. 6B and 6C, is fixed on the docking station 20 by movement along a second extension direction ER2 perpendicularly to the first extension direction ER1. The movement along the second extension direction ER2 is brought about with the adjusting device 21 of the docking station 20.

The adjusting device 21 to this end includes a lever arrangement 19 including an adjusting element 31 for adjusting or moving the fluid cell 1 along an extension direction ER2 perpendicularly to the extension direction ER1. To this end, two recesses 14 (see FIG. 6A) for receiving the adjusting element 31 are provided on the fluid cell housing 2. With the fluid cell 1 placed onto the mount 25, the adjusting element 31 typically formed in the manner of a bolt or pin, engages into both recesses 14 (only one recess is noticeable in FIG. 6A).

The lever arrangement 19 is adjustably mounted on the fluid cell housing 2 with two three-joint arrangements 27, which each comprise a first joint 27a, a second joint 27b, and a third joint 27c. The lever arrangement 19 comprises two identically formed lever arrangements 27d, which are each adjustably mounted on the docking station 20 with three-joint arrangement 27. The two three-joint arrangements 27 are also formed identically. In the following, the construction of one of the two three-joint arrangements 27 is explained representatively for both three joint arrangements 27. The three-joint arrangement 27 includes a first, second and third joint 27a, 27b, and 27c. The first joint 27a connects the docking station 20 in an articulated manner with a support lever 27e, which in turn connects the second joint 27b in an articulated manner with the lever element 27d. The third joint 27c connects the lever element 27d directly, in an articulated manner, with the adjusting element 31. Apart from this, the third joint 27c is linearly adjustably mounted on the docking station with a slotted guide 30. This adjusting element 31 of the adjusting device 21 is connected to the third joint 27c of the lever arrangement 19.

The lever arrangement 27 can be actuated by a worker with an actuating element 26 of the adjusting device 27, which can be formed for example as a handle 41. An actuation of the actuating element 26 or handle 41 along the first extension direction ER1 causes the adjusting element 31 to be moved relative to the mount 25 of the docking station 20, via the lever arrangement 19, along the second extension direction ER2. The handle 41 can be connected to the support lever 27d in an articulated manner with a further joint 27f.

Since the adjusting element 31 is received in the recesses 14 of the fluid cell 1, the fluid cell 1 with the fluid cell housing 2 and the fluid cell valve device 11 is driven during this movement along the second extension direction ER2. By moving the fluid cell 1 along the extension direction ER2, both the fluid cell housing 2 and also the fluid cell valve device 11 firmly connected to the fluid cell housing 2 are thus also moved relative to the mount 25 of the docking station 20 and also relative to the docking valve device 28. In this way, the desired adjustment of the docking valve bodies 29a, 29b, and 29c and of the fluid cell valve bodies 23a, 23b, and 23c from their respective closed position into their respective open position takes place as has already been illustrated by way of the FIGS. 5A to 5C. The arrangement of the fluid cell 1 relative to the mount 25 shown in FIG. 6C corresponds to the arrangement of the fluid cell valve device 11 relative to the docking valve device 28 shown in FIG. 5C. In the state shown in FIG. 6C, oil can be conducted out of the oil reservoir 9 via the oil reservoir line 8c and the third fluid line 8c of the docking station 20. Following this, or at the same, the volume of the housing interior 2 can be reduced by moving the housing cover 5 along the axial direction A, i.e., along the first extension direction ER1, as has already been explained above by way of FIG. 2. In the state shown in FIGS. 6C and 6D, (raw) oil can also be conducted via the first fluid line 22a of the docking station 20 and the raw oil line 8a of the fluid cell 1 into the filter device 6, filtered there and subsequently again conducted as clean (oil) out of the filter device 6 via the clean oil line 8b and the second fluid line 22b of the docking station 20.

FIGS. 7A and 7B additionally show the function of an attachment mechanism 71 of a fluid cell 1 that is alternative to the previously explained examples. The fluid cell 1 of FIGS. 7A and 7B can be releasably attached with its attachment mechanism 71 to a docking station 20 which is not shown in FIGS. 7A and 7B. The attachment mechanism 71 includes two U- or C-shaped hand levers 72. Each of these hand levers 72 engages in a slotted guide 73 of the fluid cell 1, which in the example of FIGS. 7A and 7B is formed as a guide groove 74. Thus, each hand lever 72 is assigned two such slotted guides 73 or guide grooves 74. Each of the slotted guides 73 or the guide grooves 74 is plotted along a U- or C-shaped directrix. Along this U- or C-shaped directrix, the U- or C-ends 75 are moveably guided in the respective slotted guide 73 or guide groove 74. The hand levers 72 are each adjustable between an unlocking and a locking position, wherein in the unlocking position no locking, and in the locking position, a locking of the fluid cell 1 with a locking structure of the docking station 20 is or can be realised. In the process, the U- or C-ends 75 interact with the slotted guides 73 or the guide grooves 74 so that the hand levers 72 are each locked in the unlocking and the locking position.

In FIG. 7A, it is illustrated how the locking of the hand levers 72 in the unlocking position (shown with continuous line) can be released so that the hand levers 72 can be adjusted into an intermediate position (shown with dashed line) present between the unlocking and the locking position. Accordingly, the locking of the hand levers 72 in the unlocking position can be released in that the hand levers 72, with respect to the fluid cell 1, are moved towards the outside and subsequently folded over in order to assume their intermediate position. Following this, the hand levers 72 can, guided in the slotted guides 73 or the guide grooves 74, be adjusted in the direction of their locking position.

By contrast, it is illustrated in FIG. 7B how the hand levers 72 can be adjusted from their intermediate position (shown with dashed line) subject to being locked in their locking position. Accordingly, the locking of the hand levers 72 in the locking position can be created in that the hand levers 72 are folded over and subsequently moved towards the inside. The locking of the hand levers 72 in the locking position can be accompanied by a releasable attaching of the fluid cell 1 to the docking station 20. It is to be understood that the attachment mechanism 71 can also be actuated in a manner exactly opposite to the one described above.

It is understood that the foregoing description is that of the exemplary embodiments of the disclosure and that various changes and modifications may be made thereto without departing from the spirit and scope of the disclosure as defined in the appended claims.

What is claimed is:

1. A fluid cell for an assembly with a docking station and for filtering oil, the fluid cell comprising:
   a fluid cell housing partly surrounding a housing interior and comprising a housing opening, wherein the housing interior has a differential volume;
   a housing cover that can be releasably attached or is releasably attached to the fluid cell housing for closing the housing opening;
   a filter device arranged in the housing interior for filtering the oil, in which a filter element is arranged and which fluidically communicates with a raw oil line for conducting the oil to be filtered into the filter device and having a clean oil line for conducting the filtered oil out of the filter device;
   an oil reservoir for storing oil, which has a variable volume, which is arranged in the housing interior, and which fluidically communicates with an oil reservoir line for conducting oil out of the oil reservoir, wherein the oil reservoir is formed by a covering made of a flexible material, and wherein the oil reservoir is configured to adjust a first volume of the oil reservoir to a second volume of the oil stored in the oil reservoir; and
   a fluid cell valve device for closing and opening the raw oil line, the clean oil line, and the oil reservoir line.

2. The fluid cell according to claim 1, wherein:
   the fluid cell valve device includes for each of the three lines an adjustable fluid cell valve body, which is adjustable between a closed position, in which the respective fluid cell valve body each seals in a fluid-tight manner a fluid cell valve opening provided in the line concerned, and an open position, in which the respective fluid cell valve body opens the fluid cell valve opening for oil to flow through, and
   the fluid cell valve bodies are preloaded with a respective fluid cell preloading element towards the closed position.

3. The fluid cell according to claim 1, wherein the fluid cell valve device is configured such that it is adjustable with an external adjusting device of the docking station.

4. The fluid cell according to claim 1, wherein the respective fluid cell valve opening is adjustably arranged in the raw oil line, the clean oil line, and the oil reservoir line, respectively.

5. The fluid cell according to claim 1, wherein:
   in the raw oil line, in the clean oil line, and in the oil reservoir line a tubular body each designed sleeve-like is adjustably arranged relative to the raw oil line, the clean oil line, and the oil reservoir line, respectively, and
   a front-face opening of the tubular body forms the respective—adjustable valve opening.

6. The fluid cell according to claim 1, wherein the covering is made of an elastic material.

7. The fluid cell according to claim 1, wherein the housing cover in the state attached to the fluid cell housing is formed adjustably relative to the fluid cell housing between a maximum position, in which the housing interior delimited by the fluid cell housing and the housing cover has a maximum volume, and a minimum position, in which the housing interior has a minimum volume.

8. The fluid cell according to claim 1, wherein:
   the housing opening extends in an opening plane, and
   the housing cover is adjustably attached to the fluid cell housing transversely, typically perpendicularly, to the opening plane in particular along an axial direction.

9. The fluid cell according to claim 7, wherein the oil reservoir and the housing interior are configured, dimensioned, and matched to one another such that by adjusting the housing cover from the maximum position towards the minimum position, in particular into the minimum position, oil stored in the oil reservoir is at least partially forced out of the oil reservoir via the oil reservoir line.

10. An assembly for an internal combustion engine of a motor vehicle, the assembly comprising:
    fluid cell according to claim 1; and
    a docking station comprising a first, second, and third fluid line that can be fluidically connected to the internal combustion engine, which furthermore comprises a mount, onto which the fluid cell can be placed and releasably fixed with an adjusting device of the docking station, configured such that with the fluid cell fixed on or in the docking station, one of these three fluid lines each fluidically communicates with the raw oil line, the clean oil line and the oil reservoir line of the fluid cell, respectively.

11. The fluid cell according to claim 1, wherein the covering is at least partially formed by a film.

12. The fluid cell according to claim 1, wherein the oil reservoir and the housing interior are configured such that in a state, in which the oil reservoir is maximally filled with oil, the oil reservoir is partly arranged in the differential volume of the housing interior.

* * * * *